United States Patent
Pan

(10) Patent No.: US 7,354,278 B2
(45) Date of Patent: Apr. 8, 2008

(54) RECOVERY APPARATUS FOR BIOS CHIP IN A COMPUTER SYSTEM

(75) Inventor: Wen-Jun Pan, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 310 days.

(21) Appl. No.: 11/025,156

(22) Filed: Dec. 29, 2004

(65) Prior Publication Data
US 2005/0262398 A1    Nov. 24, 2005

(30) Foreign Application Priority Data
Aug. 5, 2004    (CN)    ............ 2004 1 0051031

(51) Int. Cl.
*H01R 12/00*    (2006.01)
(52) U.S. Cl. ............................. 439/70; 439/638
(58) Field of Classification Search .............. 439/70, 439/638, 188; 713/2
See application file for complete search history.

(56) References Cited

U.S. PATENT DOCUMENTS

| 5,835,695 | A | 11/1998 | Noll |
| 6,554,650 | B2* | 4/2003 | Kayworth et al. ......... 439/638 |
| 6,916,208 | B2* | 7/2005 | Chen et al. ................ 439/639 |

* cited by examiner

*Primary Examiner*—Tho D. Ta
*Assistant Examiner*—Travis Chamebrs
(74) *Attorney, Agent, or Firm*—Morris Manning Martin LLP; Tim Tingkang Xia, Esq.

(57) ABSTRACT

A BIOS recovery apparatus for recovering a primary BIOS chip of a motherboard in a computer system comprises a switch controller unit (100), a connecting socket (106), and a plurality of insulated flexible cords (101, 102, 103). The connecting socket comprises a top socket (50), a bottom socket (51) and a printed circuit board (52). The top socket and the bottom socket are attached on opposite sides of the printed circuit board. The insulated flexible cords connect the switch controller unit and the connecting socket together. A secondary BIOS chip is received in the top socket and a primary BIOS chip is received in the bottom socket. The switch controller unit can be a button switch or a parallel port controller.

5 Claims, 2 Drawing Sheets

RECOVERY APPARATUS FOR BIOS CHIP IN A COMPUTER SYSTEM

BACKGROUND OF THE INVENTION

1. Field of the Invention

The present invention relates to a recovery apparatus, and more particularly to a BIOS recovery apparatus for recovering a basic input output system (BIOS) chip of a motherboard in a computer system.

2. Description of the Related Art

The use of computers, especially personal computers (PCs) is widespread. The computing power of the PC, whether coupled to a network or operating as a stand-alone device, has increased significantly as new computer designs move into production. In view of the fact that many computer users are relatively unfamiliar with the technical aspects of computer operation, computer manufacturers have made a concerted effort to simplify operation of the computer. For example, many computer systems are pre-loaded with computer software so that a purchaser simply plugs the computer in and turns it on. In addition, software manufacturers have attempted to simplify the operating system itself.

However, there are still certain aspects of computer operation that baffle the typical user, and can cause significant difficulties even for the more experienced user. For example, when the computer is first powered up or reset, a software program, typically designated as a "basic input-output system" (BIOS) initializes the computer and permits the startup of an operating system, such as Microsoft MS-DOS. The BIOS program typically resides in a nonvolatile memory such as a read-only memory (ROM), an electrically programmable read only memory (EPROM), electrically erasable programmable nonvolatile memory (EEPROM) and flash memory devices (e.g., flash EEPROM). If the BIOS chip is defective for any reason, the computer will not function properly. Therefore, the BIOS chip is firstly needed to be detached from a motherboard. Then it is reattached to the motherboard after being reprogrammed with a recovery disc. This operation is inconvenient and time-consuming and likely to damage the motherboard in attachment and/or detachment of the BIOS chip.

Thus there is a significant need for a BIOS recovery apparatus to recover from a BIOS ROM failure in a manner that does not require BIOS ROM detached from the motherboard.

SUMMARY OF THE INVENTION

Accordingly, an object of the present invention is to provide a BIOS recovery apparatus for recovering from a BIOS chip failure in a manner that does not require detachment of the BIOS chip from the motherboard.

To achieve the above-mentioned object, a BIOS recovery apparatus for recovering a primary BIOS chip of a motherboard in a computer system comprises a switch controller unit, a connecting socket, and a plurality of insulated flexible cords. The connecting socket comprises a top socket, a bottom socket and a printed circuit board. The top socket and the bottom socket are attached on opposite sides of the printed circuit board. The insulated flexible cords connect the switch controller unit and the connecting socket together. A secondary BIOS chip is received in the top socket and a primary BIOS chip is received in the bottom socket. The switch controller unit can be a button switch or a parallel port controller.

Other objects, advantages and novel features of the present invention will be drawn from the following detailed description of a preferred embodiment of the present invention with attached drawings, in which:

DETAILED DESCRIPTION OF THE PRESENT INVENTION

Figure 1:
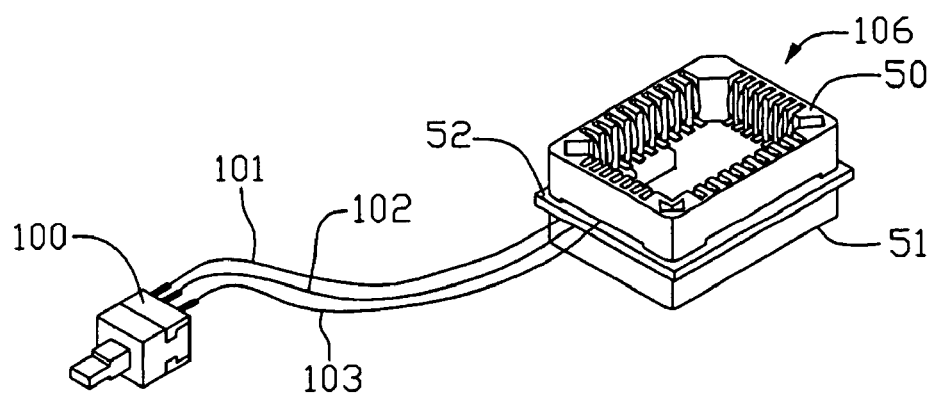
FIG. 1 is an isometric view of a BIOS recovery apparatus in accordance with a preferred embodiment of the present invention.
Figure 2:
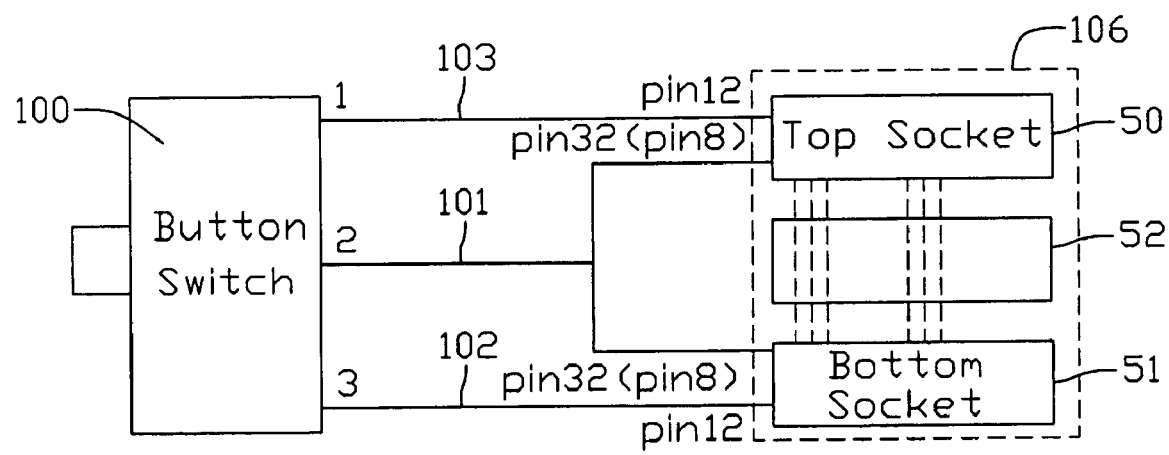
FIG. 2 is a circuit diagram of the BIOS recovery apparatus of FIG. 1.

Referring to FIGS. 1 and 2, a BIOS recovery apparatus in accordance with the preferred embodiment of the present invention comprises a button switch 100, insulated flexible cords 101, 102, 103, and a connecting socket 106.

The connecting socket 106 comprises a top socket 50, a bottom socket 51 and a printed circuit board 52. The top socket 50 and the bottom socket 51 are both plastic leaded chip carriers and symmetrically attached to opposite sides of the printed circuit board 52 respectively. Except pins 12, all the pins of the top socket 50 are soldered with corresponding pins of the bottom socket 51. A pin 32 and a pin 8 of the top socket 50 are soldered together, and a pin 32 and a pin 8 of the bottom socket 51 are soldered together. The bottom socket 51 is used to receive a primary BIOS chip (not shown) of a motherboard in a computer system. The top socket 50 is used to receive a secondary BIOS chip (not shown) therein.

The recovery procedure will be described in detail below. The secondary BIOS chip is inserted into the top socket 50 and the primary BIOS chip on the motherboard is inserted into the bottom socket 51. Thus, pins of the primary BIOS chip and pins of the secondary BIOS chip are electrically connected with each other except the corresponding pins that correspond to the pins 12 of the top socket 50 and the bottom socket 51 via the connecting socket 106. First terminals of the insulated flexible cords 101, 102, 103 are connected to nodes 2, 3, 1 of the button switch 100, respectively. Second terminals of the insulated flexible cords 101, 102, 103 are connected to the pin 32 and the pin 12 of the bottom socket 51, and the pin 12 of the top socket 50. This time, a corresponding pin of the primary BIOS chip that corresponds to the pin 12 of the bottom socket 51 is floating so that it is in a state of low voltage. And the primary BIOS chip can be designated to work only when the corresponding pin is in a low voltage state. A corresponding pin of the secondary BIOS chip that corresponds to the pin 32 of the top socket 50 is connected to a power-supply of 3.3V for being provided with a working voltage. Corresponding pins of the first and secondary BIOS chips that correspond to pins 8 of the top and bottom sockets are writing-protecting ports and are disabled in low voltage state.

The button switch 100 is firstly set in an initial state, that is, the node 2 is connected with the node 3 and this results in that the pin 12 and the pin 32 of the bottom socket 51 are connected together and the pin 12 of the top socket 50 is floating. So the corresponding pin of the primary BIOS chip that corresponds to the pin 12 of the bottom socket 51 is connected with the corresponding pin that corresponds to the pin 32 of the bottom socket 51. The voltage of the corresponding pin of the primary BIOS chip that corresponds to the pin 12 of the bottom socket 51 is changed from low to high and a voltage of the corresponding pin of the secondary BIOS chip that corresponds to the top socket 50 is low because of being floating. The motherboard is now started from the secondary BIOS chip. At the time, voltages of the corresponding pins that correspond to the pins 8 and the corresponding pins that correspond to the pins 32 of the top socket 50 and bottom socket 51 are high and they are permitted data to be written in.

In operation, the computer is firstly booted into a disk operation system (DOS) mode, and a burning software and a normal burning file of corresponding motherboard are copied to the DOS. The bottom switch 100 is then pressed to connect the node 2 and the node 1 together. Thus, the pin 12 of the top socket 50 is connected with the pin 32 of the bottom socket 51 and the pin 12 of the bottom socket 51 is floating. At the time, the corresponding pin of the secondary BIOS chip that corresponds to the pin 12 of the top socket 50 is connected to the corresponding pin of the primary BIOS chip that corresponds to the pin 12 of the bottom socket 51 and it is changed from low voltage to high voltage. The corresponding pin of the primary BIOS chip that corresponds to the pin 12 of the bottom socket 51 is floating and it is changed from high voltage to low voltage. As a result, the secondary BIOS chip does not work and the primary BIOS chip works. Then the BIOS burning software and the normal burning file are executed to reprogram the secondary BIOS chip. The power of the motherboard is cut off and the BIOS recovery apparatus is taken out when the burning process is completed.

Figure 3:
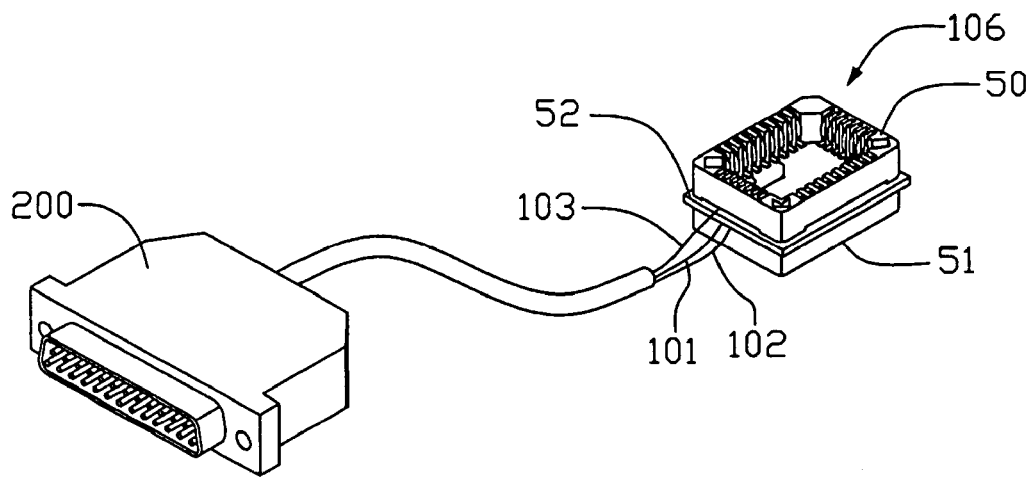
FIG. 3 is an isometric view of a BIOS recovery apparatus in accordance with a second embodiment of the present invention.
Figure 4:
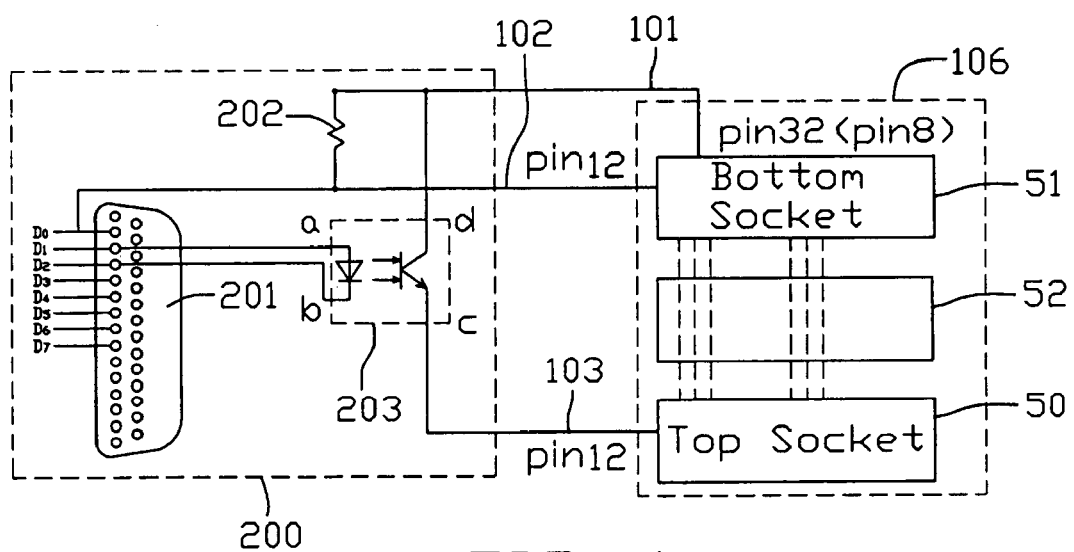
FIG. 4 a circuit diagram of the BIOS recovery apparatus of FIG. 3.

Referring to FIGS. 3 and 4, showing a BIOS recovery apparatus in accordance with a second embodiment of the invention. The difference between the two embodiments is that the button switch 100 is displaced with a parallel port controller 200. A first terminal of the insulated flexible cord 101 is connected with the pin 32 of the bottom socket 51 and a first terminal of the insulated flexible cord 102 is connected with the pin 12 of the bottom socket 51. A first terminal of the insulated flexible cord 103 is connected with the pin 12 of the top socket 50. The parallel port controller 200 comprises a parallel port 201, a resistor 202 and a photoelectric coupling 203. The parallel port 201 is communicated with a parallel port of a motherboard. A second terminal of the insulated flexible 101 is connected with a first terminal of the resistor 202 and a second terminal of the insulated flexible 102 is connected to a pin D0 of the parallel port 201. A second terminal of the resistor 202 is connected to the insulated flexible 102. Terminals a, b of the photoelectric coupling 203 are connected to the pins D1, D2, respectively. Terminal c of the photoelectric coupling 203 is connected with a second terminal of the insulated flexible cord 103 and terminal d of the photoelectric coupling 203 is connected to the insulated flexible cord 101.

The operating process of the BIOS recovery apparatus will be described in detailed below. The secondary BIOS chip is inserted into the top socket 50 and the primary BIOS chip on the motherboard is inserted into the bottom socket 51. Thus, pins of the primary BIOS chip and pins of the secondary BIOS chip are shunt-wounded respectively except the pins 12. The motherboard is powered on and an initial value of the data register of the parallel 201 is 0XFFH. At the time, the photoelectric coupling 203 does not work. The pin 12 of the bottom socket 51 maintains a high voltage because of effect of the resistor 202, and the pin 12 of the top socket 50 is in a low voltage state because of floating. As a result, the corresponding pin of the secondary BIOS chip that corresponds to the top socket 50 is in a low voltage state and the corresponding pin of the primary BIOS chip that corresponds to the bottom socket 51 is in a high voltage state. The motherboard is started from the secondary BIOS chip now. And corresponding pins of the primary and secondary BIOS chips that correspond to the pins 8 and the pins 32 of the top and bottom sockets 50, 51 are in high voltage states and they are permitted data written therein. The computer is booted into a DOS mode and the value of the data register of the parallel 201 is edited from 0XFFH to 0XFAH. The voltage of the pin 12 of the bottom socket 51 is changed from high to low and the photoelectric coupling 203 begins to work. The pin 12 of the top socket 50 is communicated with the pin 32 of the bottom socket 51 and voltage of the corresponding pin of the primary BIOS chip that corresponds to the bottom socket 51 is changed from high to low. The corresponding pin of the primary BIOS chip that corresponds to the pin 12 of the bottom socket 51 is communicated with the corresponding pin of the primary BIOS chip that corresponds to the pin 32 of the bottom socket 51 and its voltage is changed to high. So the secondary BIOS chip does not work and the primary BIOS chip works. The burning software and the normal burning file can be executed now to reload the primary BIOS chip.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A basic input output system (BIOS) recovery apparatus for recovering a primary BIOS chip of a motherboard in a computer system comprising: a switch; a top socket for receiving a secondary BIOS chip; a bottom socket for receiving the primary BIOS chip to be reprogrammed; a printed circuit board, the top socket and the bottom socket attached on opposite sides of the printed circuit board respectively; and a plurality of insulated connecting cords; wherein the insulated flexible cords connect the button switch with the top socket and the bottom socket.

2. The BIOS recovery apparatus as described in claim 1, wherein pins of the top socket and pins of the bottom socket are soldered with each other except a pair of certain pins that are connected to the button switch.

3. A basic input output system (BIOS) recovery apparatus for recovering a primary BIOS chip of a motherboard in a computer system comprising: a parallel port controller; a top socket for receiving a secondary BIOS chip; a bottom socket for receiving the primary BIOS chip to be reprogrammed; a printed circuit board, the top socket and the bottom socket attached on opposite sides of the printed circuit board; and a plurality of insulated flexible cords; wherein the insulated flexible cords connect the parallel port controller with the top socket and the bottom socket.

4. The BIOS recovery apparatus as described in claim 3, wherein the parallel port controller comprises a parallel port, a resistor and a photoelectric coupling, the photoelectric coupling is connected between the parallel port and the resistor.

5. The BIOS recovery apparatus as described in claim 3, wherein pins of the top socket and pins of the bottom socket are soldered to each other respectively except a pair of certain pins that are connected to the parallel port controller.

\* \* \* \* \*